United States Patent [19]

Seelinger

[11] 4,341,374
[45] Jul. 27, 1982

[54] WATER TABLE WITH LOW PROFILE CONVEYOR SYSTEM

[75] Inventor: John A. Seelinger, Beaver, Pa.

[73] Assignee: Anderson Engineers, Inc., Carnegie, Pa.

[21] Appl. No.: 126,551

[22] Filed: Mar. 3, 1980

[51] Int. Cl.³ .............................................. B23K 7/08
[52] U.S. Cl. ........................................ 266/49; 83/155;
  83/156; 198/342; 198/343; 266/65; 414/292
[58] Field of Search ................... 266/49, 65; 148/9 R;
  83/106, 155, 155.1, 156; 198/342, 343; 414/290,
  292; 432/72

[56] References Cited

U.S. PATENT DOCUMENTS

| | | | |
|---|---|---|---|
| 3,743,260 | 7/1973 | Alleman | 266/65 |
| 4,047,706 | 9/1977 | Tronvold | 266/49 |
| 4,162,060 | 7/1979 | Anderson et al. | 266/49 |
| 4,220,318 | 9/1980 | Anderson et al. | 266/49 |

Primary Examiner—John P. Sheehan
Attorney, Agent, or Firm—Webb, Burden, Robinson & Webb

[57] ABSTRACT

A water table and submersible conveyor system for use with an in-line material handling system, particularly a system in which the work is processed by burning, is disclosed. The water table includes opposing end walls whose top portions each define a substantially rectangular opening to accommodate a conveyor carrying a workpiece and end doors for sealing the openings having vertical slots with resilient seals mounted therein for engaging and effecting a watertight closure about sealable links of the conveyor. The water level in the water table can be raised to submerge and protect the conveyor beneath the workpiece during the burning operation.

23 Claims, 9 Drawing Figures

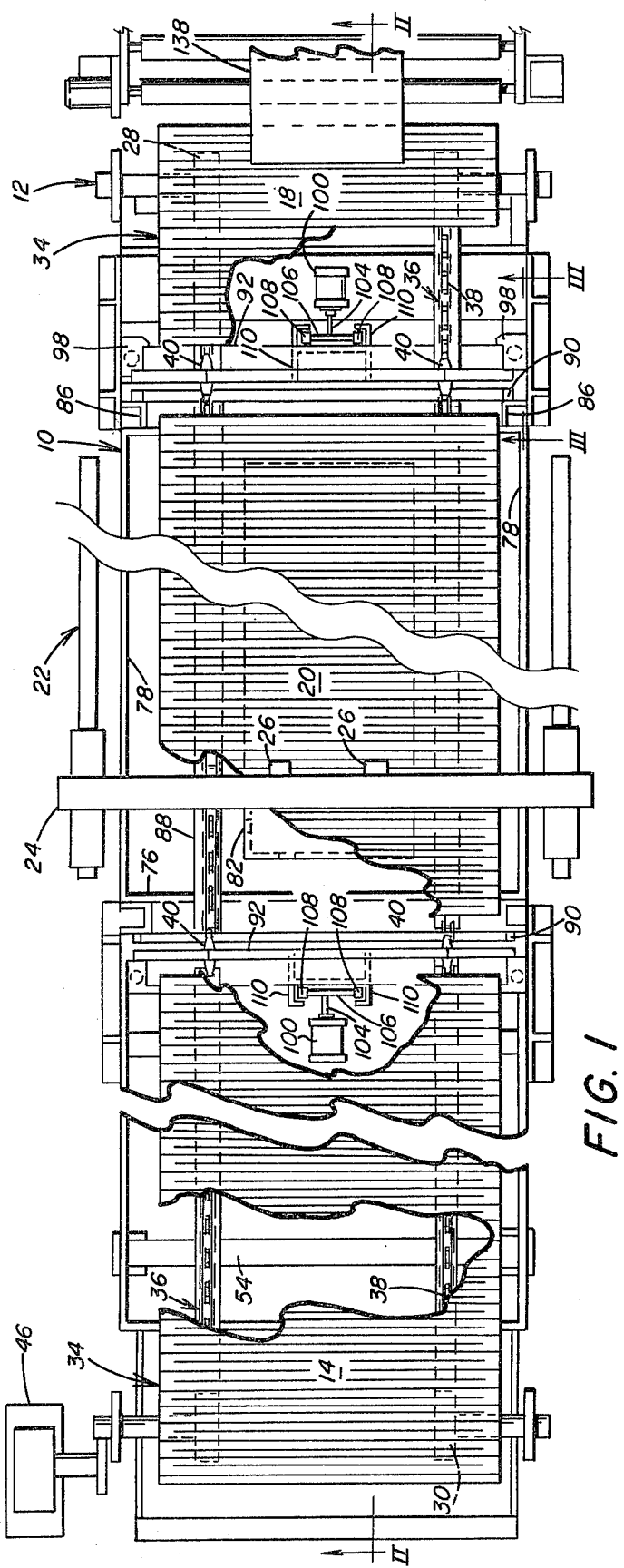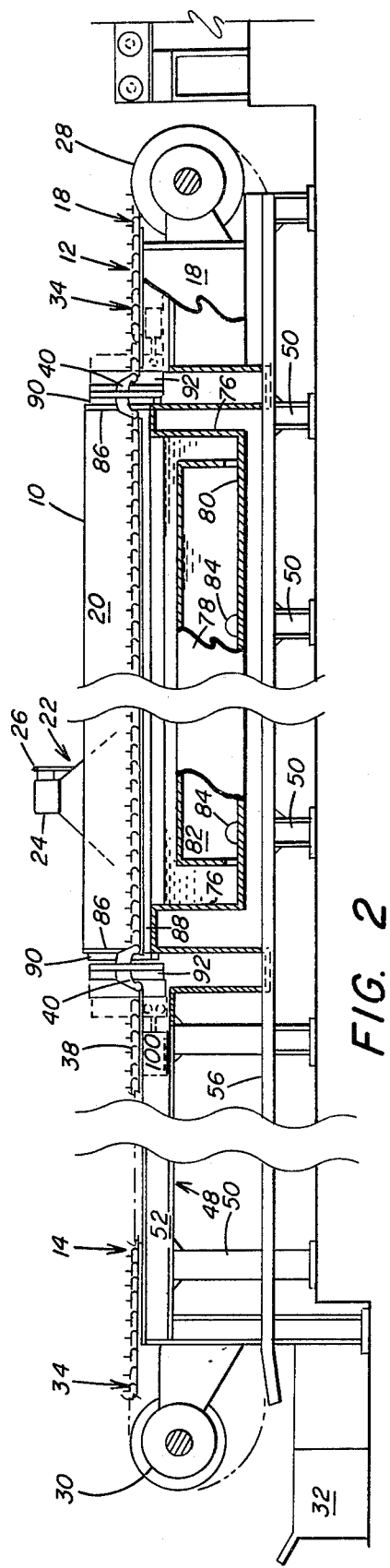
FIG. 1
FIG. 2

WATER TABLE WITH LOW PROFILE CONVEYOR SYSTEM

BACKGROUND OF THE INVENTION

1. Field of the Invention

This invention relates to in-line material handling systems for transporting a workpiece from one processing station to another. In particular, the invention is used with systems for transporting metal plate to and from a burning station in which a flame cutting machine is positioned above a water table.

2. Description of the Prior Art

Use of a flame cutting machine generates much pollution in the form of swarf and dross. In order to contain this pollution, the workpiece has been sometimes placed upon closely spaced burning bars positioned above a water table. As the workpiece was cut, the swarf and dross fell into and collected in the water table. The presence of water beneath the workpiece helped to reduce the pollution created and the amount of hot metal present during cutting.

After the flame cutting process was completed, the workpiece was removed from the burning bars by an overhead crane. Although the pollution was substantially reduced by the use of a water table, operation of the flame cutter was not continuous as considerable downtime was needed for removing the finished workpiece, placing another workpiece on the grate and removing swarf and dross from the water table.

More recently, a conveyor system comprising a sprocket chain supporting cutting bars which passes the workpiece beneath the flame cutting machine and over the water table has been substituted for the fixed burning bars so that workpieces can be placed in-line while the flame cutting machine is in operation. After a workpiece is cut, the conveyor system can advance it to an off-loading station where it can be removed and at the same time advance a new workpiece to the burning station. Thus, there is less downtime between cutting operations.

In addition to cutting bars, the sprocket chain of the conveyor system can be designed to support slag collecting elements that catch and remove the swarf and dross from the water table. In order for the slag collecting elements supported on the sprocket chain to function properly and to avoid damaging the slag collecting elements during the burning process, they are submerged below the water level in the water table.

An example of this type of material handling system is the subject of U.S. Patent Application Ser. No. 917,102, filed June 19, 1978, and issued as U.S. Pat. No. 4,220,318. In a system disclosed in that application, an endless sprocket chain conveyor which supports lateral burning bars and slag collector elements, passes through substantially rectangular openings near the top portion of the end walls of a water table located beneath a flame cutting machine. Spaced along the sprocket chain at measured intervals are transition links in the shape of an inverted U which, when the workpiece is positioned beneath the flame cutting machine, are centered over the openings in the end walls of the water table. Thus, the end doors in the water table can be closed and the water level raised to submerge the sprocket chain, slag collecting elements and/or burning bars below the workpiece to protect them during the cutting operation. The transition links allow the end doors to be sealed without engaging or interfering with the sprocket chain since the doors fit within the inner portion of the inverted U.

However, in certain applications there may be disadvantages to this system. The shape of the transition link results in a sprocket chain conveyor having a high profile which requires additional height clearance at each end of the chain conveyor. Another disadvantage of this transition link design is that the link is fabricated from relatively heavy material having sufficient strength to withstand a large bending moment caused by tension on the sprocket chain during use and shock loading resulting from stopping and starting the conveyor. Therefore, a need exists for a water table having an end door adapted to accommodate a sprocket chain conveyor having a low profile transition link.

SUMMARY OF THE INVENTION

The present invention is a water table and conveyor system suitable for use in an in-line material handling system, particularly a system in which the work is processed by burning. The system comprises a water table having opposing end walls defining substantially rectangular openings in their top portions through which passes an endless conveyor preferably comprising sprocket chains and workpiece supporting members, and end doors for sealing the openings, each having openings, preferably vertical slots with resilient seals mounted therein for engaging and effecting a watertight closure about sealable links in the sprocket chains of the conveyor system. The preferred sealable link has an arcuate shape, when viewed in elevation, with the inner or concave portion oriented to clear intermediate sprocket teeth of sprocket wheels driving the conveyor so that the link may engage non-adjacent sprocket teeth. The sealable link also has a flat, elliptical cross section along its central portion to contact the resilient seal with a gradually tapering surface devoid of sharp angles that would promote water leakage or cause undue wear on the seal. In one embodiment, the seal comprises two inflatable tubes which when deflated provide enough clearance to allow an end door to engage the sealable link without appreciable friction, and when inflated effect a watertight seal about the sealable link.

According to the present invention, a workpiece is first placed on the conveyor system at an on-loading station. The conveyor is activated and advances the workpiece to a burning station beneath the flame cutting apparatus and over the water table. As soon as the workpiece is so positioned, a second workpiece can be placed on the conveyor at the loading station. The water table end doors are then closed and resilient seals in vertical slots in the doors engage the sealable links of the conveyor. The water level in the water table is raised to submerge the sprocket chain, slag collecting elements and/or burning bars of the conveyor and the cutting procedure can begin. After cutting, the water level is lowered to a point below the openings, the end doors are lowered, thereby disengaging the sealable links of the sprocket chains, and the finished workpiece can be advanced to an off-loading station as a new workpiece is advanced to the burning station.

Thus, the present invention includes a novel water table end door and sealable link to provide a low profile system for substantially continuous operation of the flame cutting machine. In addition, the sealable link is not subjected to high bending moment stresses of prior art links and therefore need not be fabricated from expensive materials.

A complete understanding of the present invention will be obtained from the present description when taken with the accompanying drawings.

BRIEF DESCRIPTION OF THE DRAWINGS

In the Figures:

FIG. 1 is a plan view of the preferred embodiment of a water table and conveyor system as used with an in-line material handling system with portions of the conveyor cut away;

FIG. 2 is a side elevation view of the material handling system in section taken along line II—II of FIG. 1;

DESCRIPTION OF THE PREFERRED EMBODIMENTS

Figure 3:
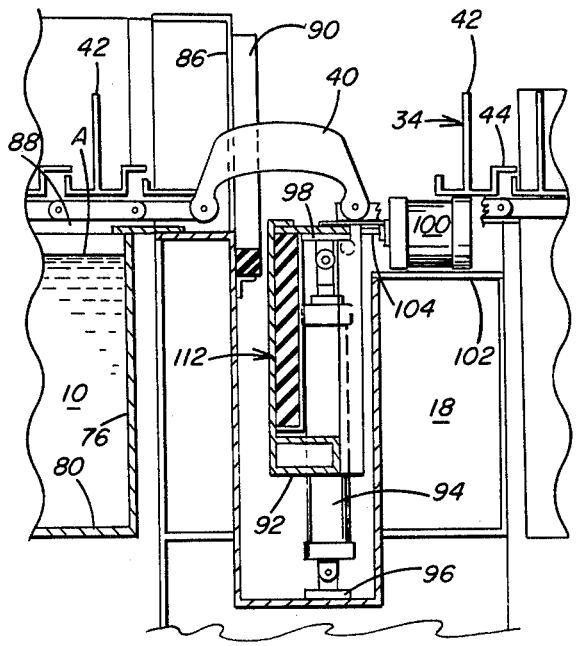
FIG. 3 is a partial sectional view of the invention with the end door in the lowered position taken along line III—III of FIG. 1.

Referring to FIGS. 1 and 2, the preferred water table 10 and conveyor system 12 are shown integrated in an in-line plate handling system. The in-line plate handling system includes an on-loading station 18, a burning station 20 and an off-loading station 14.

The burning station 20 comprises a water table 10 positioned beneath a conventional burning apparatus 22 which includes a movable bridge beam 24 carrying torches 26. The on-loading station 18 comprises the portion of the conveyor system 12 upstream of the water table 10 (to the right of the water table in FIGS. 1 and 2) and includes a first set of sprocket wheels 28. The off-loading station 14 comprises that portion of the conveyor system 12 downstream of the burning station 20 and includes a second set of sprocket wheels 30. The off-loading station 14 may also include a waste container 32 positioned adjacent the downstream end of the conveyor system 12.

As shown in FIGS. 1 through 5, the conveyor system 12 comprises a conveyor 34 having endless sprocket chain 36 which travel in a flat loop about the water table 10 and includes a series of sprocket links 38 interrupted by sealable links 40 spaced at predetermined intervals, vertical burning bars 42 and slag collecting elements 44 mounted transversely between the sprocket chains 36 and mounted on the sprocket links 38. The conveyor 34 is driven by a driving means connected to the second set of sprocket wheels 30 and is preferably in the form of an electric gear motor 46 located adjacent the second sprocket wheel.

The conveyor 34 and sets of sprocket wheels 28, 30 are supported on a framework 48 comprising upright members 50, longitudinal beams 52 and lateral beams 54. The framework 48 also includes a return conveyor support 56 which may comprise sections of angle iron welded to the upright members 50 and pass beneath the water table 10.

Figure 6:
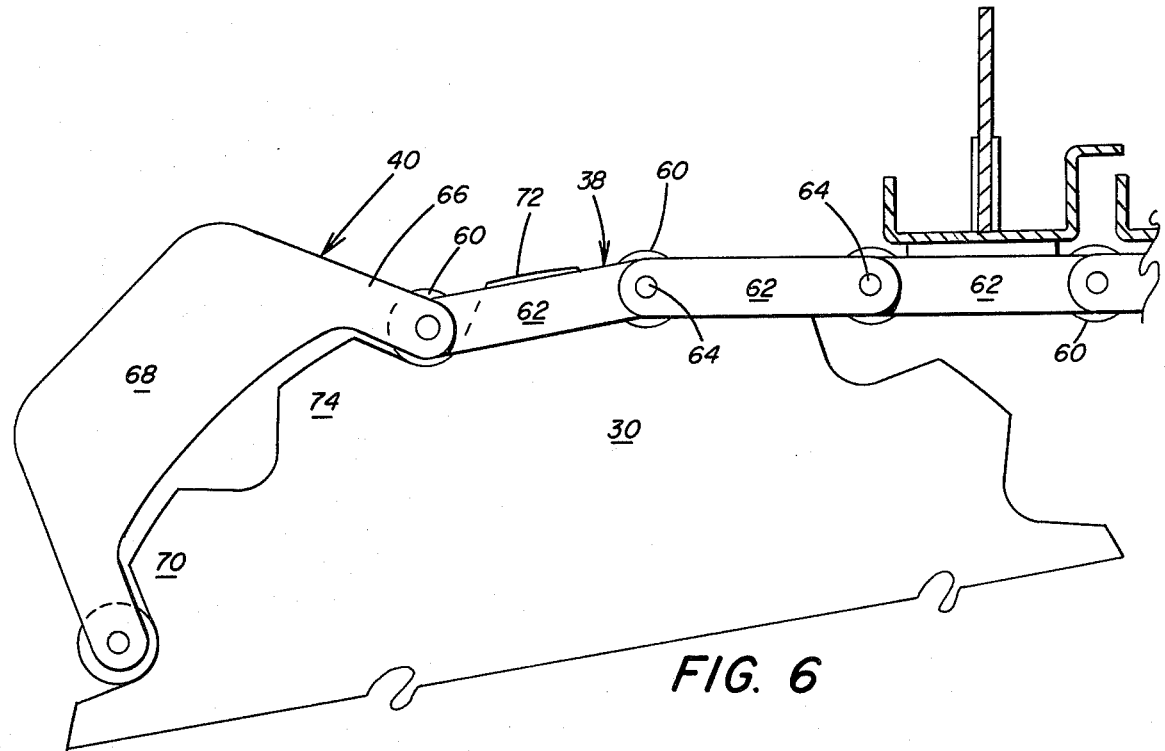
FIG. 6 is a fragmentary side elevation view of the sprocket chain and a sealable link engaging a sprocket wheel.
Figure 7:
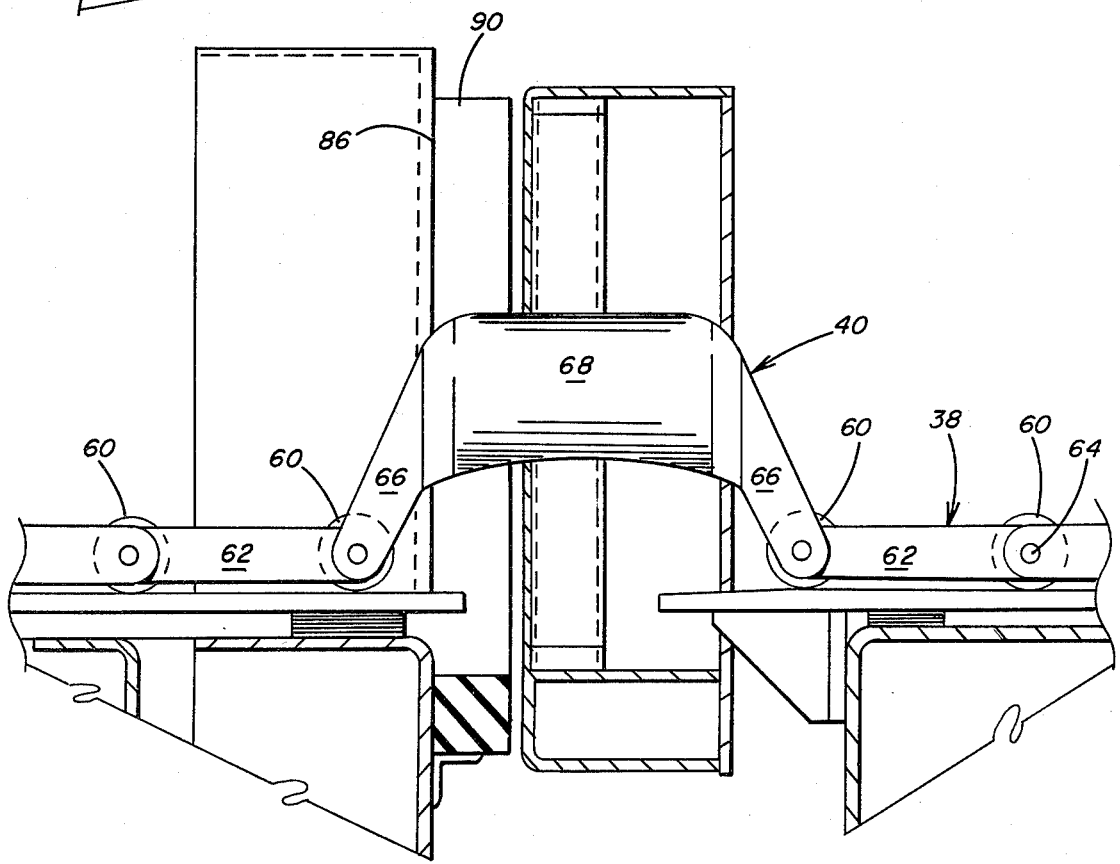
FIG. 7 is a simplified enlarged fragmentary cross-sectional view of the invention similar to the showing of FIG. 4 with the door in section.
Figure 9:
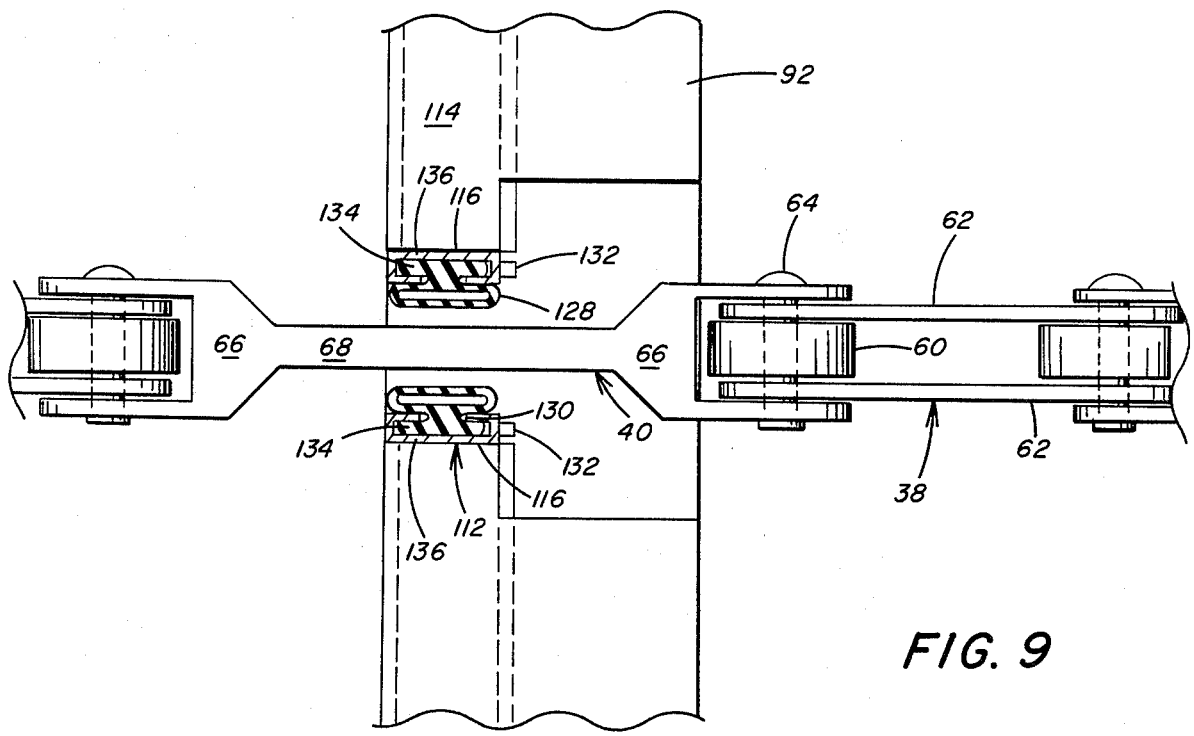
FIG. 9 is a partial plan view of another embodiment of the invention showing an end of the table, a sealable link and inflatable sealing means.

The sprocket links 38, shown in FIGS. 6, 7 and 9 without vertical burning bars 42 and slag collecting elements 44, comprise rollers 60, roller link plates 62 and pins 64.

Figure 8:
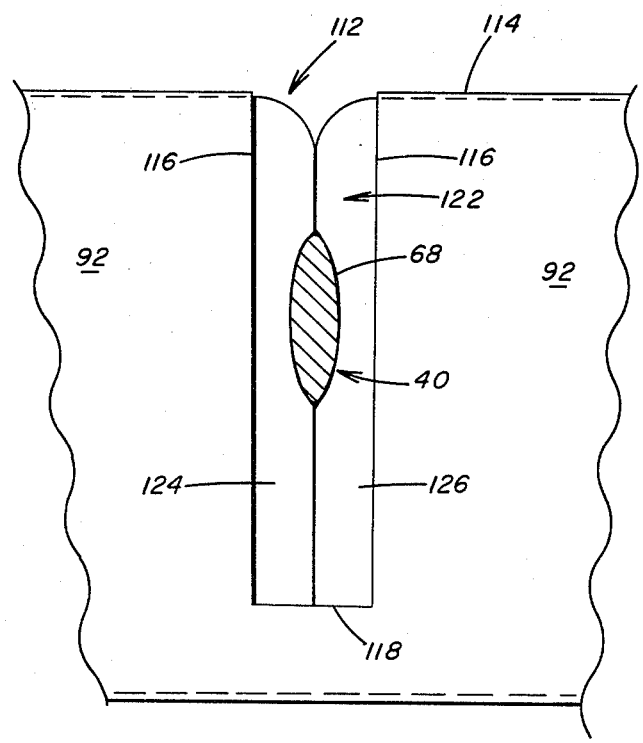
FIG. 8 is a fragmentary end view of the water table end door in the raised position engaging a sealable link shown in section.

The sealable links 40, also shown in FIGS. 6, 7 and 9, are connected to the sprocket links 38 by means of clevis-shaped terminal portions 66 which engage the link on either side of the roller link plates 62 and are held in position by pins 64. The sealable link 40 has a central portion 68 that is arcuately shaped in the longitudinal direction and, as shown in FIG. 8, has an elliptical cross section. As shown in FIGS. 6 and 7, the sealable link 40 is approximately twice as long as a sprocket link 38 to allow for stretch and wear of sprocket chains 36. The arcuate shape of the central portion 68 of the sealable link 40 enables it to engage the sets of sprocket wheels 28, 30 at two non-adjacent sprocket teeth 70, 72 by curving over the intermediate sprocket tooth 74.

Figure 4:
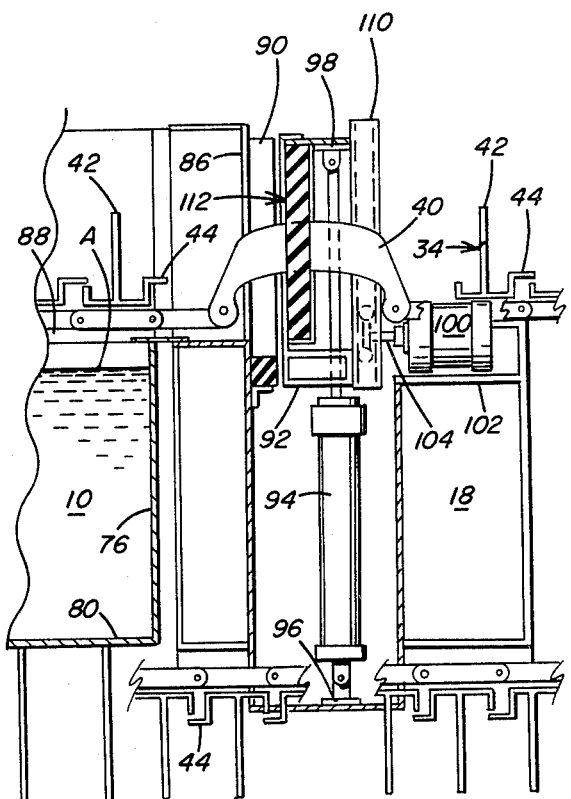
FIG. 4 is a partial sectional view similar to FIG. 3 with the door in the raised position.
Figure 5:
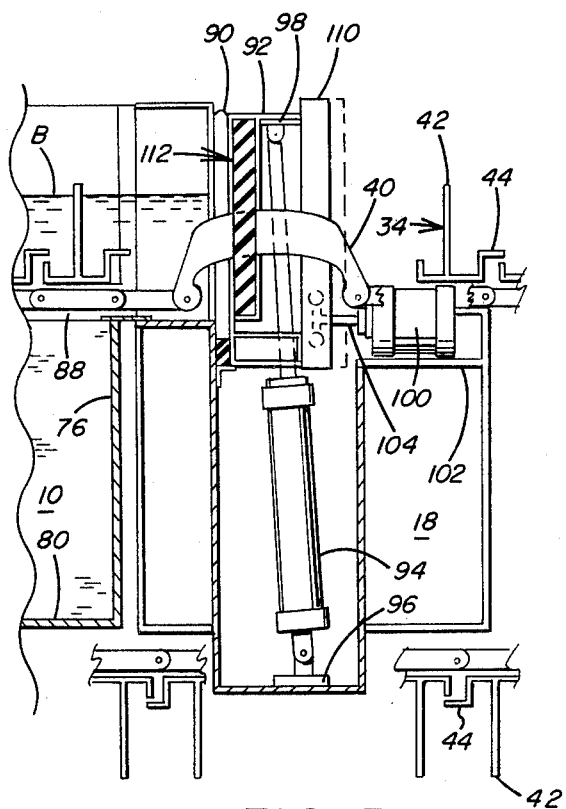
FIG. 5 is a partial sectional view similar to FIG. 3 with the door in the sealed position.

As shown in FIGS. 2 and 4, the water table 10 is supported by upright members 50 of the framework 48 and includes end walls 76, sidewalls 78, a bottom wall 80 and an internal chamber 82 having perforations 84 which communicate with the interior of the water table. The top portion of each of the end walls 76 has an opening 86 of substantially rectangular configuration of sufficient width and height to allow the conveyor 34 to pass through, but of a width less than the width of either end wall 76. The conveyor 34 is maintained in a substantially horizontal plane by means of a supporting surface 88 located within the water table 10 and extending the length of the water table along each sidewall 78 upon which rollers 60 of the conveyor run. Extending about the periphery of each opening 86 and mounted on the exterior surface of each end wall 76 is a sealing member such as a closed cell seal 90 preferably made of a resilient, waterproof material, e.g. rubber, neoprene, etc.

Openings 86 are adapted to be closed by water table end doors 92 which are substantially rectangular in shape and of a width and height to cover closed cell seals 90. As shown in FIGS. 1 and 2, end wall 76, end door 92 and the end door supporting structure described hereinafter located adjacent the on-loading station 18, are similar in construction to those corresponding elements located adjacent the off-loading station 14, but of reverse hand. Hence, only those elements adjacent one station, in this case the on-loading station 18, need to be described in detail. The end door 92 is supported by two double action pneumatic lifting cylinders 94 positioned at either side of the door, FIGS. 1, 3, 4 and 5. The lifting cylinders 94 are pivotally mounted on a base 96 at their cylinder ends and are pivotally attached to the end door 92 at a flange 98. The base 96 is located between the water table 10 and the on-loading station 18.

The end door 92 is secured against the closed cell seal 90 by means of double action pneumatic closing cylinders 100 shown in FIGS. 1, 3, 4 and 5. The closing cylinders 100 are mounted horizontally on a ledge 102 attached to the on-loading station 18. Closing cylinder rod 104 is threaded into a carriage 106 having four wheels 108 which engage and are movable along a pair of opposed U-shaped channels 110 mounted vertically on the end door 92. Of course, hydraulic lifting and closing cylinders may be used instead of pneumatic cylinders.

Vertical slots 112, shown in FIGS. 3, 4, 5, 8 and 9, are formed in upper surface 114 of the end door 92 and are located at positions along the width of the end door corresponding to the distance between the endless sprocket chains 36. The slots 112 are defined by two opposed vertical walls 116 and a floor 118. A resilient seal 122 is located within each slot 112 and comprises two seal members 124, 126 each attached to and extending along the entire length of each vertical wall 116 of a slot 112. The two seal members 124, 126 are adapted to flex against each other, the vertical walls 116 and floor 118 of the slot 112 to form a watertight closure for the slot. The resilient seal 122 preferably is made from an abrasion-resistant flexible material, such as neoprene.

In another embodiment of the invention, partially shown in FIG. 9, the resilient seal comprises two opposed, vertically oriented inflatable tubes 128, 130 which are connected via a nipple 132 to a source of compressed air (not shown). Each inflatable tube 128, 130 has a tongue 134 along its length shaped to fit within a groove 136 formed in the vertical sidewall 116 of the slot 112. When the tubes 128, 130 are inflated, they expand against each other and the walls 116 to form a watertight seal of the slot.

OPERATION OF THE INVENTION

A workpiece to be processed, which can be a metal plate 138, is first placed on the vertical burning bars 42 of the conveyor 34 at the on-loading station 18 by means (not shown), such as an overhead crane or a separate conveyor. During this phase of the system operation, the water level in the water table 10 is lowered to a predetermined position, denoted by line A in FIGS. 3 and 4, which is at least below the opening 86 in the end walls 76. The conventional burning apparatus 22 is raised to its highest position to accommodate the movement of the conveyor 34 and plate 138 thereunder, and the end doors 92 are lowered to allow movement of the conveyor 34 through the opening 86.

The end doors 92 are lowered toward the base 96 by the lifting cylinders 94 to a point where the upper surface 114 of the end door is below the opening 86 in the water table 10. As the end door 92 is lowered, it is kept in a vertical position at a predetermined distance from the closed cell seal 90 by the carriage 106 of the closing cylinder 100 whose wheels 108 travel within the U-shaped channels 110 mounted on the door. The distance of the door 92 from the closed cell seal 90 is varied by activating the closing cylinder 100.

The metal plate 138 is then transported to the burning station 20 by advancing the conveyor 34 and is positioned under the burning torches 26 so that the sealable links 40 of the sprocket chains 36 are positioned directly above the resilient seals 122 in each slot 112 of the end doors 92. The added length of the sealable links 40 facilitates the positioning of the sprocket chain 36. The end doors 92 are raised by activating the lifting cylinders 94 and the two seal members 124, 126 of the resilient seals 122 engage and deform about the central portion 68 of the sealable link 40 to form a watertight closure. It is desirable that the cross-sectional profile of the sealable link 40 have an elliptical profile having nearly pointed ends so that the seal members 124, 126 deform about the sealable link 40 without the formation of gaps. In this fashion, the conveyor 34, comprising in part endless sprocket chains 36, can be submerged in the water table 10 so that no part of the conveyor protrudes above the end doors 92.

The end doors 92, now in a raised position, are urged against the closed cell seal 90 by action of the closing cylinders 100 to form a watertight cover for the openings 86 in the end walls 76 of the water table. The water level in the water table 10 can now be raised to a predetermined level above the lowermost portion of the opening 86, designated by line B, thus submerging the sprocket chain 36, slag collecting elements 44 and all or a part of the burning bars 42. The water level in the water table 10 can be raised or lowered by the introduction or evacuation of air or other fluid into the internal chamber 82 which causes water in the internal chamber to fill or empty through perforations 84, in a manner described in co-pending U.S. Patent Application Ser. No. 917,102, filed June 19, 1978, and issued as U.S. Pat. No. 4,220,318. The burning station 20 is now ready for the burning operation.

After the burning operation is completed, the water level is lowered to a predetermined level at least below the opening 86, the end doors 92 are separated from the closed cell seal 90 by the closing cylinders 100, and the end door is lowered by the lifting cylinders 94, thereby disengaging the sealable links 40 from the resilient seals 122. The plate 138 can now be advanced by the conveyor 34 to off-loading station 14.

At the off-loading station 14, the finished workpiece can be removed by a crane or other means (not shown) and swarf and dross can be dumped from the slag collecting elements 44 into the waste container 32.

If inflatable tubes 128, 130 are provided in slots 112 of the end door 92, the end door can be raised and lowered without rubbing the resilient seal against the surface of the central portion 68 of the sealable link 40. In this way, abrasion of the resilient seal 122 by the sealable link 40 is kept to a minimum.

The entire process can be computer controlled. With suitable servomechanisms electronically tied into a control, each step of the process can be performed at the appropriate time.

Having described presently preferred embodiments of the invention, it is to be understood that it may be otherwise embodied within the scope of the appended claims.

I claim:

1. A water table and submersible conveyor system comprising;
    a water table having opposed end walls, each of said end walls having an opening therethrough;
    a conveyor passing through the openings;
    end doors of a size sufficient to cover the openings, said end doors having means for allowing the conveyor to pass through the end doors when they cover the openings; and
    sealing means on the end doors for engaging and forming a watertight seal between the conveyor and the end doors such that the water level in the table can be raised above the bottom of the openings.

2. The water table and submersible conveyor system of claim 1 further comprising a means for raising and lowering the end doors.

3. The water table and submersible conveyor system of claim 1 wherein the conveyor includes a sealable link which engages the sealing means located on the end doors.

4. The water table and submersible conveyor system of claim 3 wherein the sealable link has a unitary central portion.

5. The water table and submersible conveyor system of claim 4 further comprising a sprocket wheel engaging the sealable link and wherein the sealable link is arcuately shaped and of a size to engage non-adjacent sprocket teeth of the sprocket wheel.

6. The water table and submersible conveyor system of claim 1 wherein the sealing means comprises a resilient seal located within a slot formed in an upper surface of the end doors.

7. The water table and submersible conveyor system of claim 6 wherein the resilient seal comprises a pair of opposed inflatable tubes.

8. A water table and submersible conveyor system comprising:
 a water table having opposed end walls;
 each end wall having a top portion including an opening;
 an end door adjacent each end wall of a size sufficient to cover the opening;
 means for moving the end door to cover and to uncover the opening;
 a conveyor passing through the openings and having at least one sprocket chain;
 the sprocket chain including at least two sealable links each having a unitary central portion and spaced along the conveyor at a distance corresponding to the distance between the end doors when covering the opening;
 the end door having an upper surface defining a vertical slot for each sprocket chain, the slot having opposing vertical walls and having mounted therein a resilient seal comprising two seal members each attached to and coextensive with an opposing vertical wall;
 each vertical slot located on the end door such that, when the conveyor belt is positioned such that the sealable links of the sprocket chain are proximate the end doors and the end doors are moved to cover the openings, the resilient seals engage the sealable links and the seal members deform about the central portions to form a watertight seal.

9. The water table and submersible conveyor system of claim 8 wherein the seal members comprise tubes capable of being inflated to form a watertight seal about the central portions of the sealable links and deflated to provide a clearance between the central portion and the tubes.

10. The water table and submersible conveyor system of claim 8 wherein the end door includes flanges at each end and wherein the means for moving the end door comprises at least one double acting lifting cylinder for raising and lowering the end door, said cylinder being pivotally mounted on a base and extending generally upward to be pivotally attached to a flange; and at least one double acting closing cylinder mounted generally horizontally on a ledge for urging the end door toward and away from the opening.

11. The water table and submersible conveyor system of claim 10 wherein the end door further comprises a pair of substantially vertical U-shaped channels for each closing cylinder and the closing cylinder further comprises a cylinder rod and a carriage having a plurality of wheels for engaging and moving along the U-shaped channels; the carriage being fixedly journaled about an end of the rod.

12. The water table and submersible conveyor system of claim 8 wherein no part of the conveyor extends above the upper surface of the end door when the end door covers the opening.

13. The water table and submersible conveyor system of claim 8 wherein the sprocket chain includes a plurality of sprocket links, each such link being approximately one-half the length of the sealable links.

14. The water table and submersible conveyor system of claim 13 wherein the sprocket chain is an endless chain, the conveyor is adapted to travel in a flat loop about the water table, and the conveyor system further comprises at least two sprocket wheels, each of which engages the sprocket chain at the ends of the loop.

15. The water table and submersible conveyor system of claim 14 wherein the sealable links are arcuately shaped, such that a sealable link can engage two non-adjacent sprocket teeth of the sprocket wheel by curving over an intermediate sprocket tooth.

16. In an in-line material handling system comprising an on-loading station, a burning station including a burning apparatus mounted on a movable bridge beam and an off-loading station, the improvement in a water table and submersible conveyor system comprising:
 a water table positioned beneath the burning apparatus and having opposed end walls;
 each end wall having a top portion including an opening;
 an end door adjacent each end wall of a size to cover the opening;
 means for moving the end door to cover the openings;
 the conveyor system comprising a conveyor passing through the openings and having at least one sprocket chain;
 the sprocket chain including at least two sealable links each having a unitary central portion and spaced along the conveyor at a distance corresponding to the distance between the end doors when covering the opening;
 the end door having an upper surface defining one vertical slot for each sprocket chain having opposing vertical walls and having mounted therein a resilient seal comprising two seal members each attached to and coextensive with an opposing vertical wall;
 each vertical slot located on the end door such that, when the conveyor is positioned such that the sealable links of the sprocket chain are proximate the end doors and the end doors are moved to cover the openings, the resilient seals engage the sealable links and the seal members deform about the central portions to form a watertight seal so that the water table may be filled with water to a level at least above the sprocket chain of the conveyor.

17. The device of claim 16 wherein the seal members comprise inflatable tubes capable of being inflated to form a watertight seal about the central portions of the sealable links and deflated to provide a clearance between the central portion and the inflatable tubes.

18. The device of claim 16 wherein the end door includes flanges at each end and wherein the means for moving the end door comprises at least two double acting lifting cylinders for raising and lowering the end door, each pivotally mounted on a base and extending generally upward to be pivotally attached to a flange; and at least one double acting closing cylinder mounted generally horizontally on a ledge for urging the end door toward and away from the opening.

19. The device of claim 16 wherein the end door further comprises a pair of substantially vertical U-shaped channels for each closing cylinder and the closing cylinder further comprises a cylinder rod and a carriage having a plurality of wheels for engaging and moving along the U-shaped channels, the carriage being fixedly journaled about an end of the rod.

20. The device of claim 18 further comprising a framework for supporting the water table, base and ledge.

21. The device of claim 20 wherein the sprocket chain comprises an endless chain of sprocket links, the conveyor travels in a substantially flat loop about the water table, and the conveyor system further comprises at least two sprocket wheels supported by the framework, each of which engages the sprocket chain at the ends of the loop.

22. The device of claim 16 wherein no part of the conveyor extends above the upper surface of the end door when the end door covers the opening.

23. The device of claim 21 wherein the sealable links are arcuately shaped such that the sealable link can engage two non-adjacent sprocket teeth of the sprocket wheel by curving over an intermediate sprocket tooth.

* * * * *